United States Patent [19]

Koike et al.

[11] Patent Number: 4,876,678
[45] Date of Patent: Oct. 24, 1989

[54] SOUND REPRODUCING DEVICE FOR PLAYING A RECORD DISC HAVING A PLURALITY OF RECORDED GROOVES

[75] Inventors: Eishi Koike, Sagamihara; Yasuhiko Yusa, Machida, both of Japan

[73] Assignee: Ozen Corporation, Machida, Japan

[21] Appl. No.: 327,762

[22] Filed: Mar. 23, 1989

[30] Foreign Application Priority Data

Mar. 23, 1988 [JP] Japan ................... 63-68702

[51] Int. Cl.⁴ .................... G11B 17/06; G11B 3/60
[52] U.S. Cl. .......................... 369/31; 369/63; 369/65; 369/67
[58] Field of Search .............. 369/31, 63, 65, 66, 369/67

[56] References Cited

U.S. PATENT DOCUMENTS

| | | | |
|---|---|---|---|
| 4,150,831 | 4/1979 | Watanabe | 369/31 |
| 4,622,658 | 11/1986 | Koike | 369/67 |
| 4,680,747 | 7/1987 | Blake | 369/65 |
| 4,694,445 | 9/1987 | Koike | 367/65 |

FOREIGN PATENT DOCUMENTS

2638072 7/1980 United Kingdom ............. 369/66

*Primary Examiner*—Steven L. Stephan
*Attorney, Agent, or Firm*—Arnold S. Weintraub; William D. Blackman

[57] ABSTRACT

A sound reproducing device is disclosed in which an index tracking portion formed on a record disc consists of a notch on the continous flange of rotational periphery of a record disc unit. A center pin of the device is normally urged outside of a casing by a spring which also urges an index setting arm with a push button type index setting rotary knob supported on the tip end of said center pin. An index setting portion consists of a plurality of openings formed in the casing and arranged along the rotational plane of said record disc unit. The index setting arm has a resilient engaging hook on its lower tip end, the engaging hook directed toward the rotational center of the record disc unit. The engaging hook engages with the flange of the record disc unit where a specific index setting portion is selected by rotation of the push button type index setting knob. Pushing the index setting knob down makes the engaging hook pass through an index setting openings. The center pin keeps a speaker unit out of engagement with a pickup such that the pickup returns to the starting point of sound reproduction. The engaging hook returns through the index tracking portion when the index tracking portion comes on the engaging hook by rotational movement of the record disc unit, causing the center pin to retract so as to impart stylus pressure to the stylus by returning the speaker unit by a stylus pressure spring.

4 Claims, 5 Drawing Sheets

SOUND REPRODUCING DEVICE FOR PLAYING A RECORD DISC HAVING A PLURALITY OF RECORDED GROOVES

BACKGROUND OF THE INVENTION

1. Field of the Invention

This invention relates to a sound reproducing device for playing a record disc having a plurality of recorded grooves. More particularly, the present invention relates to such a sound reproducing device comprising an index tracking portion which is a notch formed by cutting away a part of a flange continuously formed around the periphery of a rotary record disc unit, and a center pin rotatably supporting the record disc unit which center pin carries a push button type rotary knob thereon exposed outside a casing in such a manner that the center pin is normally urged together with the push button type rotary knob, toward the outside of the casing by a spring biasing an indexing arm.

2. Description of the Prior Art

A simplified sound reproducing device, capable of selectively reproducing a specific recorded item on a record disc having a plurality of recorded grooves each carrying respective recorded items, has been developed and becomes well known, e.g., such as described in Japanese Patent Examined Publication No. Sho 51(1976)-19763, corresponding to U.S. Pat. No. 3,712,629 and to British patent specification No. 1,336,749.

This prior art simplified sound reproducing device functions in such a manner that:

if an operator depresses a selection pole for indexing a specific item on a record disc, it acts to push an inclined face of a stylus force releasing wheel to move a stylus force releasing pole to make the stylus force releasing wheel rotate, and then a stylus force releasing pole carried by the stylus force releasing arm travels together with the stylus force releasing wheel and raises a speaker unit, allowing a pickup to return to the starting point of sound reproduction of a specific record disc unit.

At the same time, the selection pole locks a stopper pin disposed in the record disc unit and tentatively stops the rotation of the record disc unit, thereby locating the specific recorded groove at a position where the pickup, which has already returned to the aforesaid starting point of reproduction, can engage the recorded groove, while by the operator's releasing of the depression of the selection pole, the stylus force releasing pole will retract together with the stylus force releasing wheel and release the supply of current to the speaker unit, thereby imparting a stylus force to the pickup.

Accordingly, in this prior art device, a stylus force can be undesirably imparted to the pickup halfway through its returning travel to the starting point of sound reproduction, and thereby the desired record groove cannot be selected, unless the operator keeps his depression of the selection pole until its stopper pin engages the specific selection pole which has been depressed. The period of time required for effecting engagement between the stopper pin and the selection pole varies depending upon the relative position between the stopper pin and the selection pole, and therefore, the operator himself cannot forecast the necessary period of time. Consequently, the sound reproducing device mentioned above has drawbacks with respect to its lack of both reliability in selection and fast operability.

A device disclosed in Japanese Laid-Open (unexamined) Patent Publication No. Sho 60(1985)-50701, corresponding to U.S. Pat. No. 4,482,990, has been provided, with the intention of obviating the aforesaid drawbacks. However, this device was found to be disadvantageous in simplifying the device, because of the fact that the stylus force releasing means and the indexing means were complicated.

Another sound reproducing device having improved steadiness of selection and rapidity of operation has been disclosed by Japanese Laid-Open (unexamined) Patent Publication No. Sho 60(1985)-76001, corresponding to U.S. Pat. No. 4,541,085, with an intention to obviate the aforesaid drawbacks.

However, this device was also found to be disadvantageous in simplifying, because the stylus force releasing means and the indexing means were also complicated.

Moreover, a simplified sound reproducing device capable of selectively playing a record disc having a plurality of recorded grooves and further provided with a rotary dial for selecting the item to be reproduced by directing it to the item to be selected has already been developed and has been disclosed by Japanese Laid-Open (unexamined) Patent Publication No. Sho 58(1983)-17501, corresponding to U.S. Pat. No. 4,433,404 and to British Pat. No. 2,103,006-B.

However, this device has also proved to be unsatisfactory, particularly as a toy for training infants, that is, even if the user turns the rotary dial to the indexing mark or symbol to be played, the rotary dial will start rotation following the rotation of the record disc unit, thereby the indicated item which has just been selected for playing would be unplayed.

In addition, a further device having a center pin for rotatably receiving a record disc unit in which the center pin may be depressed for the purpose of releasing the stylus force has also been proposed and publicly known in Japanese Laid-Open (unexamined) Patent Publication No. Sho 57(1982)-152568, corresponding to U.S. Pat. No. 4,404,668.

However, this device has also drawbacks that it uses a plurality of selecting poles and many parts and thereby becomes very complicated in construction.

PROBLEMS IN THE PRIOR ART

Such sound reproducing devices as disclosed by the aforesaid Japanese Laid-Open (unexamined) Patent Publication Nos. Sho 60(1985)-50701, 76001 and Sho 58(1983)-17501, respectively, have drawbacks in common, complicated construction and being disadvantageous for simplifying this kind of device.

Particularly, the device disclosed by the Japanese Laid-Open (unexamined) Patent Publication No. Sho 57(1982)-17501 has a defect already referred to that the item that has just been selected and reproduced would become impossible to identify, which is not suitable for the purpose of training and has been an urgent problem to be solved.

The present invention aims to solve the above-mentioned problems of the prior art. Accordingly an object of the present invention is to provide a sound reproducing device which can securely select a desired recorded groove.

Another object of the present invention is to provide a sound reproducing device capable of performing rapid operation. A further object of the present invention is to provide a sound reproducing device of simplified construction. A still further object of the present invention is to provide a sound reproducing device suitable for training purposes in which a sound reproduction indexing symbol, once selected, could remain indicated after the selected item has been finished until the time when the next indexing is done for the purpose of selecting another item.

SUMMARY OF THE INVENTION

The present invention provides an improved and simplified sound reproducing device for playing a record disc having a plurality of recorded grooves thereon.

A sound reproducing device according to the present invention comprises:

(a) a casing;

(b) a record disc unit disposed in the casing and having a plurality of recorded grooves which define a recorded face thereof, the record disc unit having a circular periphery with an index tracking portion formed thereon, the casing having a plurality of index setting openings formed therein along the periphery of the record disc, the number of index setting openings corresponding to the number of recorded grooves;

(c) a center pin disposed in the casing, the disc unit being rotatably supported on the center pin;

(d) a speaker unit comprising a speaker cone and a sound transmitting member attached thereto;

(e) means for mounting the speaker unit to the casing, the mounting means allowing for swingable movement of the speaker unit toward or away from the recorded face of the record disc unit;

(f) a stylus force spring disposed in the casing for urging said sound transmitting member toward the recorded face of said record disc unit;

(g) a pickup interposed said sound transmitting member and said record disc unit;

(h) means for urging the pickup radially outwardly with respect to the recorded face;

(i) means for rotating the disc unit;

(j) a rotatable index setting knob disposed at an end of the center pin;

(k) an index setting arm supported by said index setting knob, the index setting arm having an engaging hook thereon for insertion into the index setting openings; and (l) a fixed indexing ring disposed outside the casing and bearing indicia thereon for showing items recorded in the grooves of said record disc unit.

The center pin mentioned above is coupled to the index setting arm and these two members can be advanced or retracted together, and when advanced the speaker unit can be moved away from the record disc unit against the stylus force.

In the simplified sound reproducing device of this invention, the items of sound reproduction shown on the indexing ring correspond to the index setting portions or recesses, while the index tracking portion is formed as a notch by cutting away a part of the upper flange formed continuously along the outer periphery of the record disc unit.

The center pin engages the push button type index setting knob which is disposed partly outside the casing. The index setting knob and the index setting arm can be moved integrally with the center pin only in an axial direction of the center pin and are normally urged outward by the spring which urges the index setting arm to retract. The index settings are formed as a plurality of apertures distributed in the casing along the surface of the rotary record disc unit.

The index setting arm can be located above any one of the index setting openings or can be recessed by turning the push button type index setting knob, which is integral with the indexing arm, in the rotational and axial direction, so that the index setting arm can be advanced together with the center pin when the push button type index setting knob is depressed against the force of spring. In addition the index setting arm has at its forward tip end an engaging hook which can elastically deform and pass over the outer edge portion of the upper flange of the record disc unit and then can slidably catch the flange when it resiliently returns to its original shape. In addition, the index setting arm can be returned to the original position by virtue of the resilient force given by the spring when the index tracking notch arrives at the portion just above the engaging hook effected by the relatively sliding rotation of the record disc unit, thereby releasing the center pin from the depressed position, releasing in turn the speaker unit, and the pickup can be placed under the stylus force.

The simplified sound reproducing device as constructed in aforesaid manner can function as follows:

At first, the push button type index setting knob is turned so that the arrow head is pointed to the desired item shown in the fixed indexing ring. The index setting arm within the casing is rotated and positioned at one of the index setting recesses by this rotation of the knob, the selected recess corresponding to the selected item on the fixed indexing ring. Next, the push button type index setting knob is depressed to make the index setting arm move downwardly together with the center pin, which urges the speaker unit against the resilient force imparted by the stylus force spring.

This downward movement of the center pin releases the stylus force applied to the pickup, allowing the pickup to return to the staring point of sound reproduction. At this moment, the terminating switch loses the support given by the pickup and begins to supply a power to the motor, thus resulting in rotation of the record disc unit. When the index setting arm moves downwardly together with the center pin, the engaging hook disposed at the frontmost end of the arm passes over and slidably catches the peripheral edge of the upper flange of the record disc unit and holds both the index setting arm and the center pin in the depressed state. Under this state, the record disc unit still continues rotation but no stylus force is applied to the pickup.

In addition, since the index setting recesses or openings are distributed along the rotating circle of the index setting arm and the record disc unit is received around the center pin while being independent of rotation of the center pin, the index setting arm and the engaging hook can maintain the set position.

When the index tracking portion formed as a notch on the periphery of the record disc arrives, by the rotation of the record disc unit, at a point just above the engaging hook, the index setting arm having the engaging hook thereon is allowed to return by passing through the notch of the index tracking portion to the original position above the record disc unit, being urged by the spring. This allows the center pin to return to its original position and releases its downward pressure on the speaker unit, which moves upward placing the pickup under stylus force. The record groove with which the pickup engages is thus started on its selected sound reproduction.

The timing necessary for imparting a stylus force to the pickup varies depending upon which index setting position the engaging hook of the index setting arm is positioned at, and yet the selected index setting position has a specific spatial relation with respect to the position of the introductory part of each record groove, so it is possible to make the pickup engage the desired groove relying on the selected item shown on the fixed indexing ring and the rotation of the push button type index setting knob.

Since the push button type index setting knob is constructed to be movable free from the rotation of the record disc unit, it does not rotate with the record disc unit, therefore, a selected position of the fixed indexing ring does not vary even when the sound reproduction of the selected item has been finished.

It has been rendered possible, according to the present invention, to provide a sound reproducing device by which not only any desired record disc can be surely selected but also satisfying fast selection and simplified construction objectives.

Furthermore, it is possible with the present invention for the recorded item which has been selected and reproduced to be indicated even after it has been finished, unlike the prior art devices, and the device of the present invention is therefore particularly suitable as a toy for training purposes.

DETAILED DESCRIPTION OF THE PREFERRED EMBODIMENT

Figure 1:
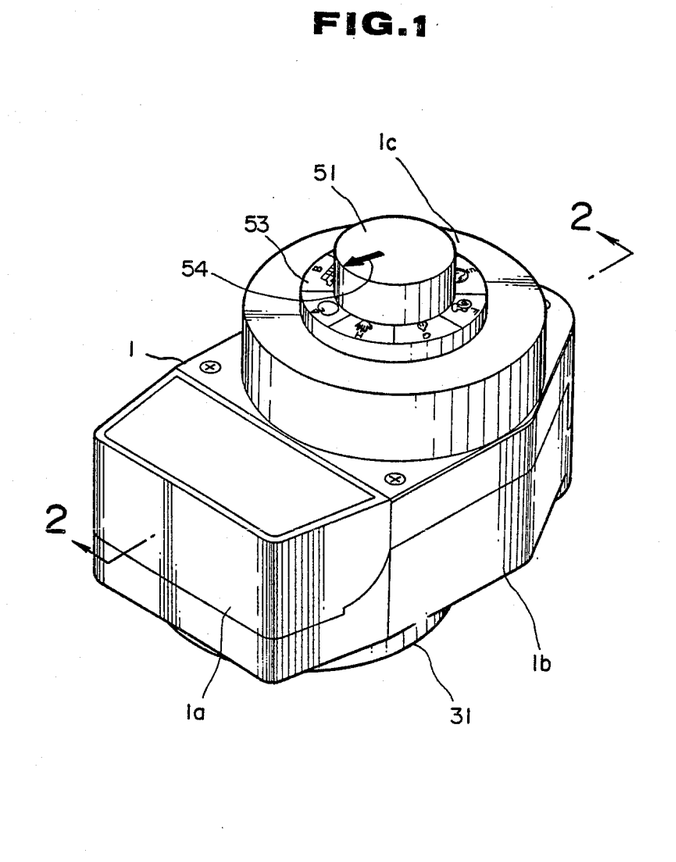
FIG. 1 is a perspective view showing a preferred embodiment of the present invention.

Referring to FIG. 1, an outside appearance of a sound reproducing device according to the present invention is shown, in which a casing 1 includes a chassis 1a, an operating box 1c integrally stacked above the chassis 1a and a housing 1b placed stacked beneath the chassis 1a.

Figure 2:
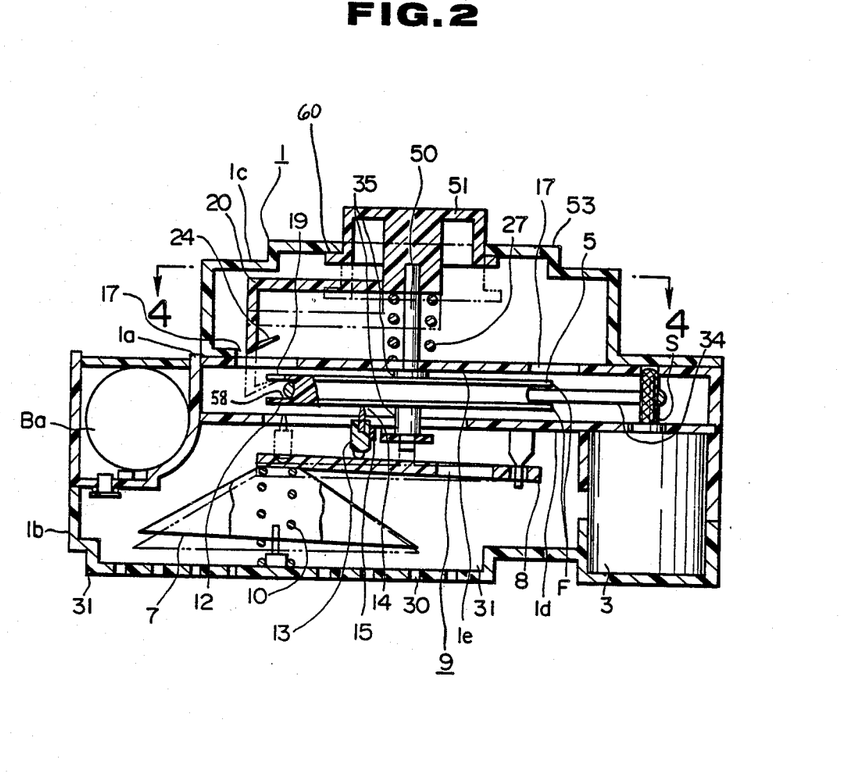
FIG. 2 is a sectional side view taken along line 2—2 of FIG. 1.

The casing 1, as shown in FIG. 2, has formed in the housing 1b a speaker box 31 having a plurality of slits 30 for emitting reproduced sounds outside. A partition plate 1d extends within the chassis 1a and an upper deck 1e also extends above the partition plate 1d within the chassis 1a.

As can be seen from FIGS. 1 and 2, the operating box 1c as shown, has a surface which contains an annular fixed indexing ring 53. The surface of the ring 53 has a plurality of recorded items which are indicated by symbols such as the pictures and accompanying letters shown in FIG. 1. Disposed within the inner central part of the indexing ring 53, is a push button type rotary index setting knob 51, the top face of which has an arrow mark 54 thereon. The index setting knob 51, as clearly shown in FIG. 2 is rotatable with respect to the interior members of the casing 1, is axially movably assembled to the casing 1, and carries a radially projecting index setting arm 20 attached thereto as an integrally formed piece. This index setting arm 20 is bent at an intermediate portion thereof downwardly along a line parallel to the axis of the rotary index setting knob 51, and the lower tip end of the index setting arm 20 bears an integrally formed and radially inwardly bent tongue-like elastic engaging hook 24.

Figure 3:
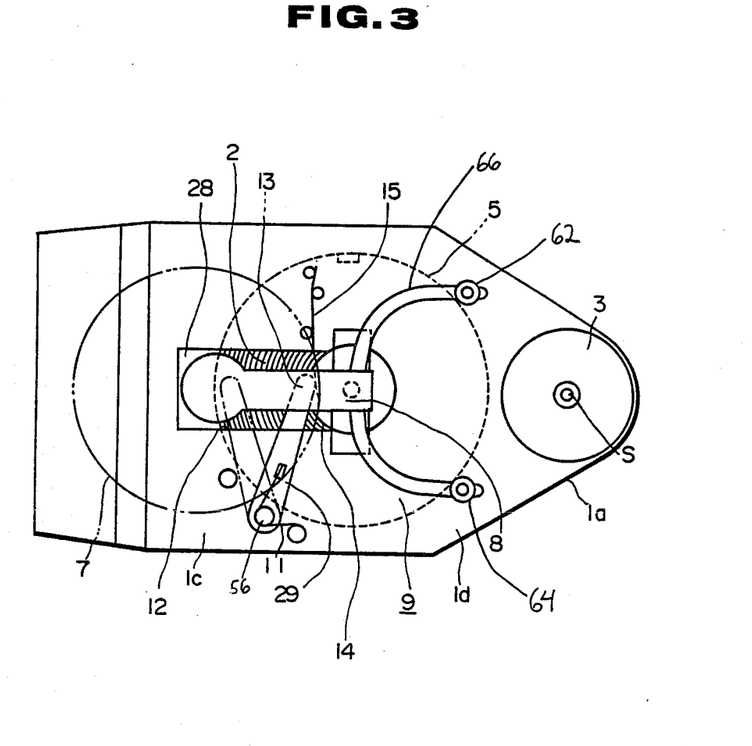
FIG. 3 is a top plan view with the chassis and housing having been taken away.

A mechanism disposed below the partition plate 1d of the chassis 1a can be observed in FIG. 3, that is, a tone arm 29 having a pickup 13 at its forward end and which is pivotally mounted at its rear end to a pivot pin 56. Mounted at the right side of the partition plate 1d in FIGS. 2–3 is a motor 3, the output shaft S of which is directed toward the upper deck 1e, as can be seen from FIG. 2. Moreover, mounted on the partition plate 1d is a Y-shaped sound transmitting member 8 which together with a speaker cone 7, makes up a speaker unit 9.

The sound transmitting member 8 is swingably supported at both tip ends 62, 64 of its bifurcated arm 66 so as to be swingably movable toward or away from the reverse face of the partition plate 1d. The remaining portion of the sound transmitting member 8 extends so that it contacts the pickup 13. The speaker unit 9 as shown by FIG. 2, is normally urged upwardly by a stylus force spring 10 located at the central part of the speaker box 31, so as to urge the pickup 13 upwardly as seen in FIG. 2.

In FIGS. 2 and 3, a reproduction terminating switch 15 is positioned in the electrical circuit to the motor 3 in such a manner that it is activated by the pickup 13; opens the circuit; and, cuts off current to the motor when the pickup 13 comes to the position where it finishes the sound reproduction.

The reproduction terminating switch 15 is positioned near the reproduction terminating point 14 adjacent to the center of the recorded face of the record disc unit 5.

An opening 28 is formed in the partition plate 1d for the pickup, by means of which the pickup 13 is allowed to pass through the partition plate 1d to contact the record disc 5.

As shown in FIG. 2, a battery Ba energizes the motor 3.

As shown in FIGS. 2 through 5, a record disc unit 5 carries eight spiralled recorded grooves 2.

Figure 4:
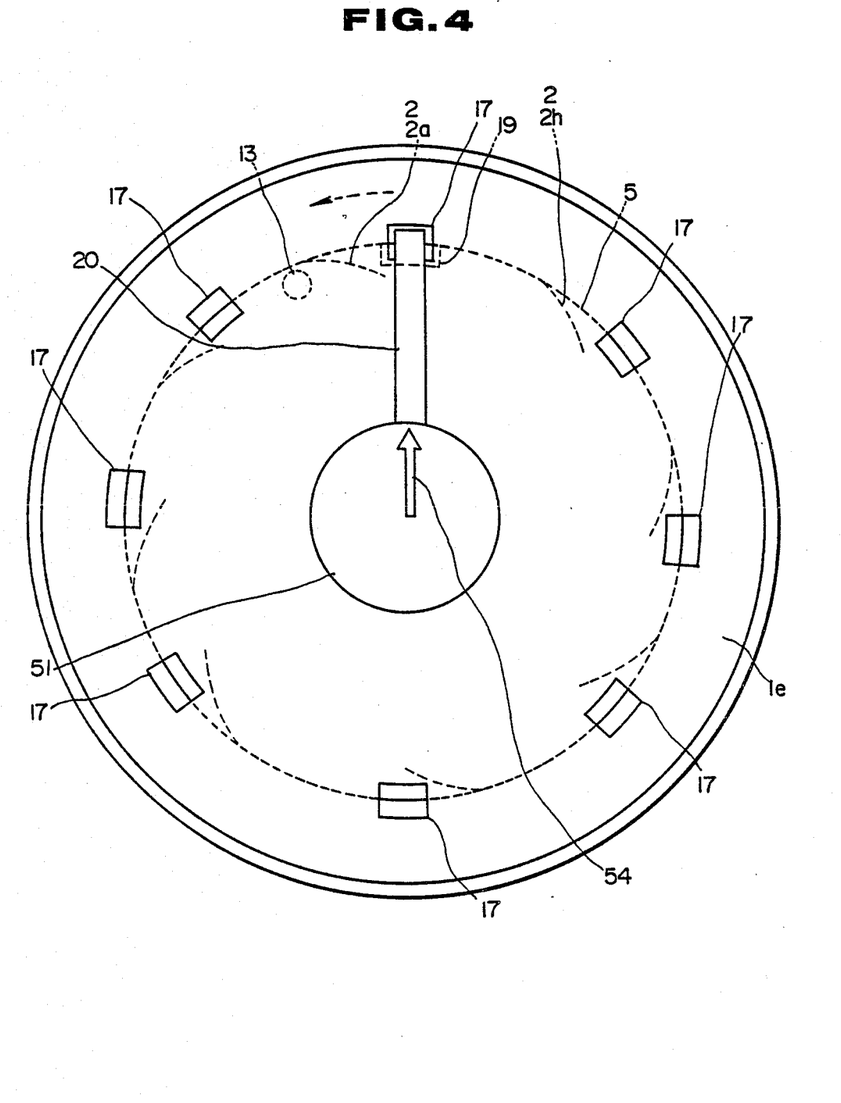
FIG. 4 is a partial view seen along line 4—4 of FIG. 2.

FIG. 4 shows only the introductory part of each of these record grooves, the number of which corresponds to the number of indexed items shown on the indicator dial 53.

The pickup 13 is normally urged by a return spring 11 radially outwardly with respect to the disc 5 toward the starting point of sound reproduction 12 and to a direction laterally away from the recorded face of the record disc 5.

The return spring 11 is wound around a pin 56 at the rear end of the tone arm 29, the pin 56 disposed as a swing axis of the tone arm 29.

Figure 5:
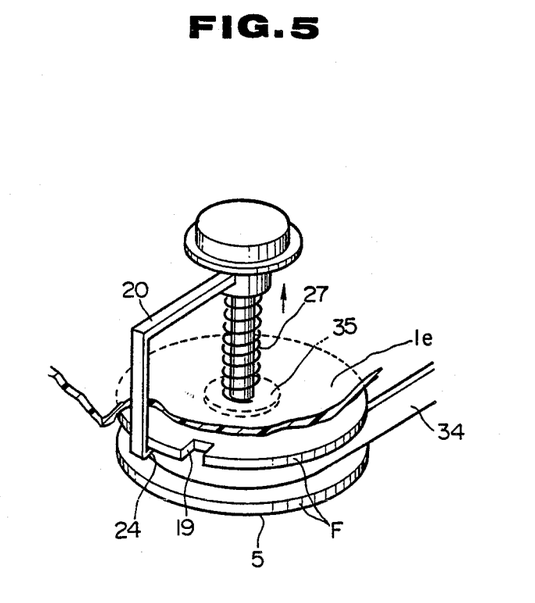
FIG. 5 is a partial perspective view showing a record disc unit, a push button type rotary knob and an indexing arm.

As particularly seen in FIG. 2, the center pin 50 is received and guided by the partition plate 1d and the upper deck 1e so as to be axially reciprocally movable both in advancing and retractive movement thereof. Around the center pin 50, the record disc unit 5 is rotatably supported in a manner allowing free rotation and advancing and retracting movement of the center pin 50 but is restrained from its axial movement by being clamped between the partition plate 1d and the upper deck 1e. Eight recorded spiral grooves are formed on the record disc unit 5 which is formed with flanges F at the periphery of both the axially upper and lower faces thereof. An annular groove 58 defined between these two flanges is used as a pulley groove, accommodating a drive belt 34. A part of the upper flange F is cut away axially and radially at its radially outer end to form an indexing tracking portion 19 as seen in FIGS. 2, 4, and 5.

A boss 35 is provided having a through hole formed therein at the center of the record disc unit 5, through which the center pin 50 is passed. The boss 35 extends both above the upper face and below the reverse face of the record disc 5, and functions as a thrust shaft located between the upper deck 1e and the partition plate 1d for limiting the axial movement of the record disc unit 5.

The above-mentioned push button type rotary index setting knob 51 is fixedly attached on the top end of the center pin 50 and is urged axially toward the outside of the casing 1 together with the center pin 50 by a coil spring 27 supported on the upper deck 1e, and the index setting arm 30 with the engaging hook 24 formed at the lower tip end thereof together are also normally urged upwardly by the spring 27 since they are attached to the knob 51. The knob 51 has an integral flange 60 extending radially outwardly as seen in FIG. 2 which retains the lower portion of the knob 51 inside the casing 1.

The lower tip end of the center pin 50 extends to a position above the sound transmitting member 8 of the speaker unit 9 and is able to push down the sound transmitting member 8 when the center pin 50 is moved downwardly.

In a state where the housing 1b, record disc unit 5, chassis 1a and the operating box 1c are assembled together, the pickup 13 moves upwardly by passing through the opening 28 toward the recorded face of the record disc unit 5 so as to be engageable with the record groove 2. At this moment, the biasing force of the stylus spring 10 is imparted through the sound transmitting member 8 to the pickup 13 as a stylus force, and the pickup 13 is positioned between the sound transmitting member 8 and the record disc unit 5 and is able to travel along the record groove 2 between the starting point 12 and the end point 14 of sound reproduction of the record disc unit 5.

The engaging hook 24 of the index setting arm 20 is normally situated above the upper flange F of the record disc unit 5 when the push button type rotary index setting knob 51 is not depressed and the index setting arm 20 is not yet lowered as shown by the solid line in FIG. 2. When the push button type rotary knob 51 is depressed and the index setting arm 20 is lowered as shown by the phantom line in FIG. 2, the engaging hook 24 moves below the upper flange F. In particular, the engaging hook 24 is arranged so that it may elastically deform by contact with the outer periphery of the upper flange F during its downward stroke from its upper position to the lower position and then the hook 24 slidably engages the lowerside of the upper flange F when it arrives at the portion therebelow, as illustrated in phantom in FIG. 2.

Since the engaging hook 24 is made to have a smaller width than that of the notch of the index tracking portion 19, it may pass through the notch axially downwardly when it comes just above the notch of the index tracking portion 19.

A resilient belt 34 is extended around and between the groove 58 of the pulley of the record disc unit 5 and around the output shaft S of the motor 3.

As particularly shown in FIG. 4, a plurality of index setting openings 17 are formed in the upper deck 1e of the casing 1 along the circular periphery of the record disc unit 5.

These index setting openings 17 are eight in number in the embodiment shown, corresponding in number to the recorded grooves 2 formed on the record disc unit 5.

The distribution of these index setting openings 17 follows the specific positional relationship with respect to the position of the pickup 13 which has already returned to the starting point of sound reproduction 12.

Also, the position of an index setting opening 17 corresponds, with respect to each circular angle, to each of the recorded items shown in the fixed indexing ring 53 fixed to the casing 1.

The sound reproducing device of the present invention operates in the manner mentioned below.

The pickup 13 when it has just finished reproduction of a specific record groove 2 stays at the reproduction end point 14, opens the terminating switch 15, and the current to the motor 3 is cut off.

Then, a user turns the push button type rotary index setting knob 51 with its arrow mark 54 to be directed to the item to be reproduced, for example, mark A as shown in FIG. 1, and then the engaging hook 24 formed at the tip end of the index setting arm 20 is positioned, as shown in FIGS. 2 and 4, above the index setting opening 17 indicated by the arrow mark 54 of the push button type rotary knob 51.

Subsequent depression of the push button type rotary index setting knob 51 against the resilient force of the spring 27 results in lowering of the rotary index setting knob 51 to the interior of the casing 2 with accompanying downward advancing of the center pin 50 together with the engaging hook 24 of the index setting arm 20. The engaging hook 24 goes down through the selected index setting opening 17. Due to the downward advancing of the center pin 50, the lowermost end of the center pin 50 pushes down the speaker unit 5 against the stylus force spring 10, and by virtue of this motion the stylus force imparted to the pickup 13 is released so that the pickup 13 can be urged by the return spring 11 to the starting point of sound reproduction 12. Upon moving of the pickup 13 away from the end point of reproduction 14, the terminating switch 15 closes since it has lost its support to keep it open, and then current is supplied to the motor 3 to rotate it, thereby beginning rotation of the record disc unit 5.

Descending movement of the engaging hook 24 effected by the user's depression on the push button type rotary index setting knob 51 moves the engaging hook 24 through the index setting opening or recess 17 formed in the upper deck 1e down to a position where it can contact the peripheral edge of the upper flange F of the record disc unit 5.

Further downward movement of the engaging hook 24 gives rise to its elastic deformation due to the fact that it is forcibly pushed against the face of the upper flange F and it passes over the edge of the flange and finally reaches the portion below the upper flange F as shown in phantom in FIG. 2.

If the user stops depression and takes his hand away from the push button type rotary knob 51, the engaging hook 24 is allowed to return by the resilient force of the spring 27 and slidably catches the flange F from its downside. Due to this movement, the index setting arm 20, push button type rotary index setting knob 51 and the center pin 50 are held together at the position to which they have advanced downwardly, and thus the position to which the speaker unit has been lowered, namely, where the stylus force applied on the pickup is released, can be maintained.

As explained heretofore, when the terminating switch 15 is closed, current is supplied to the motor 3, and the record disc unit 5 will turn in the direction shown by the arrow line shown in FIG. 4. However, since the record disc unit 5 and the center pin 50 are constructed to be rotated freely of each other, the position of the engaging hook 24 will never be varied. As a consequence, if the index tracking notch 19 turns slidable with respect to the engaging hook and arrives at the position where the engaging hook 24 is located, the engaging hook 24 will return upwardly to the position above the upper flange F by passing through the index tracking notch 19.

By this movement, the center pin 50 retracts upwardly urged by the spring 27 and releases its pressure on the speaker unit 9, and owing to the direction of rotation of the record disc 5a, the pickup 13 will engage the introductory portion of the specific record groove 2a as shown in FIG. 4.

By this engagement, the desired recorded item can be reproduced.

When the sound reproduction has been finished upon arrival of the pickup 13 at the end point 14 of sound reproduction, the pickup 13 contacts the terminating switch 15 again and opens the circuit.

Since the record disc unit 5 is rotatably supported independently of the center pin 50, the push button type rotary index setting knob 51 does not rotate with the record disc unit 5. Consequently, the push button type rotary index setting knob 51 still indicates the indexed item even when the reproduction of the specific item has been finished. This feature is very helpful in using the device of the present invention as an educational toy.

As explained heretofore, once the desired item has been selected by turning the push button type rotary index setting knob 51, the engaging hook will catch the flange F of the record disc unit 5 and it is able to hold the state where the stylus force has been released and it is also possible for it to exactly remain on the indexed item which has just been reproduced.

Although the present invention has been described herein with respect to specific embodiments thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. A simplified sound reproducing device for playing a record disc having a plurality of recorded grooves comprising:
   (a) a casing;
   (b) a record disc unit disposed in the casing and having a plurality of recorded grooves which define a recorded face thereof, the record disc unit having a circular periphery with an index tracking portion formed thereon, the casing having a plurality of index setting openings formed therein along the periphery of the record disc, the number of index setting openings corresponding to the number of recorded grooves;
   (c) a center pin disposed in the casing, the disc unit being rotatably supported on the center pin,
   (d) a speaker unit comprising a speaker cone and a sound transmitting member attached thereto,
   (e) means for mounting the speaker unit to the casing, the mounting means allowing for swingable movement of the speaker unit toward or away from the recorded face of the record disc unit;
   (f) a stylus force spring disposed in the casing for urging the sound transmitting member toward the recorded face of said record disc unit,
   (g) a pickup interposed said sound transmitting member and said record disc unit;
   (h) means for urging the pickup radially outwardly with respect to the recorded face,
   (i) means for rotating the disc unit,
   (j) a rotatable index setting knob disposed at an upper end of the center pin,
   (k) an index setting arm supported by said index setting knob, the index setting arm having an engaging hook thereon for insertion into the index setting openings; and
   (l) a fixed indexing ring disposed outside the casing and bearing indicia thereon for showing items recorded in the grooves of said record disc unit.

2. The simplified sound reproducing device of claim 1, wherein said indexing ring is disposed around said index setting knob so as to correspond to the items recorded in said record disc unit.

3. The simplified sound reproducing device of claim 1, wherein said engaging hook is a resilient piece formed at the lowermost end of said index setting arm and is directed toward the record disc unit.

4. The simplified sound reproducing device of claim 1, wherein the index setting knob remains in a fixed orientation with respect to the indicia of the indexing ring during and after movement of the pickup along a given recorded groove of the record disc unit.

* * * * *